(12) United States Patent
Cho et al.

(10) Patent No.: US 11,457,362 B2
(45) Date of Patent: Sep. 27, 2022

(54) TERMINAL DEVICE AND METHOD FOR IDENTIFYING MALICIOUS AP BY USING SAME

(71) Applicant: SAMSUNG ELECTRONICS CO., LTD., Suwon-si (KR)

(72) Inventors: Jungil Cho, Suwon-si (KR); Soonhong Kwon, Suwon-si (KR); Hyunwoo Kim, Suwon-si (KR); Minkyu Song, Suwon-si (KR); Jongsung Lee, Suwon-si (KR); Joonghwan Lee, Suwon-si (KR); Yongsu Chung, Suwon-si (KR); Daesung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 4 days.

(21) Appl. No.: 17/057,848

(22) PCT Filed: May 28, 2019

(86) PCT No.: PCT/KR2019/006389
§ 371 (c)(1),
(2) Date: Nov. 23, 2020

(87) PCT Pub. No.: WO2019/231215
PCT Pub. Date: Dec. 5, 2019

(65) Prior Publication Data
US 2021/0204135 A1    Jul. 1, 2021

Related U.S. Application Data

(60) Provisional application No. 62/677,117, filed on May 28, 2018.

(51) Int. Cl.
G06F 21/00 (2013.01)
H04W 12/122 (2021.01)
(Continued)

(52) U.S. Cl.
CPC ........ *H04W 12/122* (2021.01); *H04W 12/02* (2013.01); *H04W 12/61* (2021.01); *H04W 12/73* (2021.01)

(58) Field of Classification Search
None
See application file for complete search history.

(56) References Cited

U.S. PATENT DOCUMENTS 7,995,547 B1 *   8/2011  Barratt ............... H04W 48/16
                                                    455/423
8,655,312 B2 *   2/2014  Stahlberg ............ H04L 63/14
                                                    455/410

(Continued)

FOREIGN PATENT DOCUMENTS

KR   10-2014-0098721 A    8/2014
KR   10-2015-0028139 A    3/2015

OTHER PUBLICATIONS

Communication dated May 31, 2021 issued by the Korean Intellectual Property Office in Korean English Application No. 10-2020-7029216.

(Continued)

Primary Examiner — Maung T Lwin
(74) Attorney, Agent, or Firm — Sughrue Mion, PLLC

(57) ABSTRACT

A method of identifying a malicious access point (AP) by a terminal apparatus includes obtaining first performance information related to hardware of a first AP based on a first beacon signal received from the first AP, comparing the first performance information with previously stored second performance information of a second AP, and determining whether the first AP is a malicious AP, based on a result of the comparing.

13 Claims, 13 Drawing Sheets

(51) Int. Cl.
  *H04W 12/73* (2021.01)
  *H04W 12/61* (2021.01)
  *H04W 12/02* (2009.01)

(56) References Cited

U.S. PATENT DOCUMENTS

| | | | |
|---|---|---|---|
| 8,782,745 B2 | 7/2014 | Stevens et al. | |
| 9,049,225 B2* | 6/2015 | Jana | H04W 12/122 |
| 2006/0200862 A1 | 9/2006 | Olson et al. | |
| 2007/0242610 A1 | 10/2007 | Wu et al. | |
| 2014/0150049 A1* | 5/2014 | Kwon | H04W 12/12 |
| | | | 726/1 |
| 2014/0376533 A1 | 12/2014 | Tohzaka et al. | |
| 2015/0350228 A1* | 12/2015 | Baxley | H04W 12/08 |
| | | | 726/23 |
| 2016/0164889 A1* | 6/2016 | Zhang | H04W 12/122 |
| | | | 726/23 |
| 2017/0126705 A1 | 5/2017 | Mirashrafi et al. | |
| 2017/0223046 A1* | 8/2017 | Singh | H04L 63/1491 |
| 2019/0036951 A1* | 1/2019 | Kim | H04W 12/122 |
| 2019/0149994 A1* | 5/2019 | Van Antwerp | H04L 63/101 |
| | | | 726/4 |

OTHER PUBLICATIONS

International Search Report (PCT/ISA/210) and Written Opinion (PCT/ISA/237) dated Sep. 3, 2019 issued by the International Searching Authority in International Application No. PCT/KR2019/006389.
Kwon, Hyuk-chan, "Next-Generation Wireless LAN Security Technology", 2015 Annual Security Users' Festival, 19th Anti-hacking Workshop, (70 pages total).

* cited by examiner

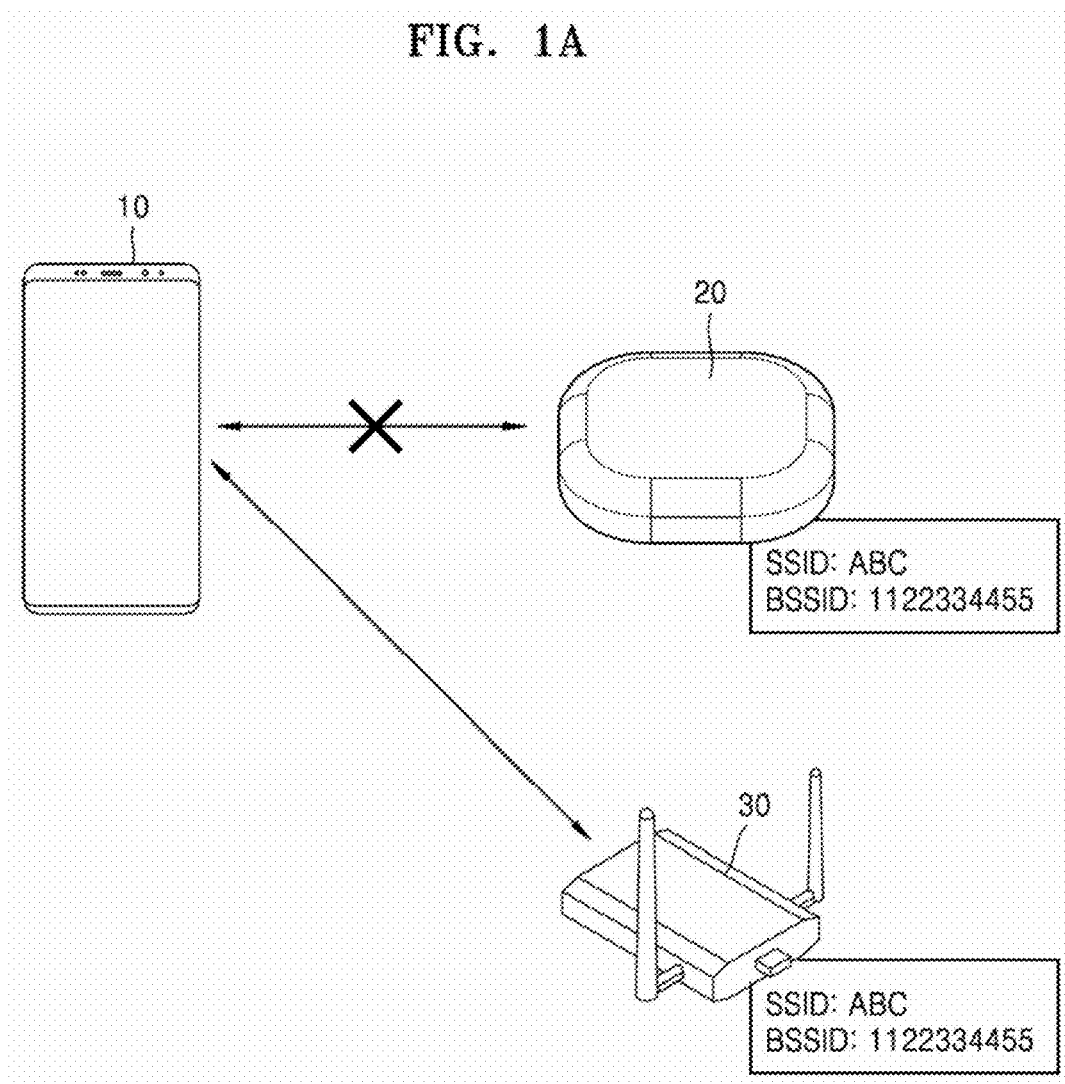

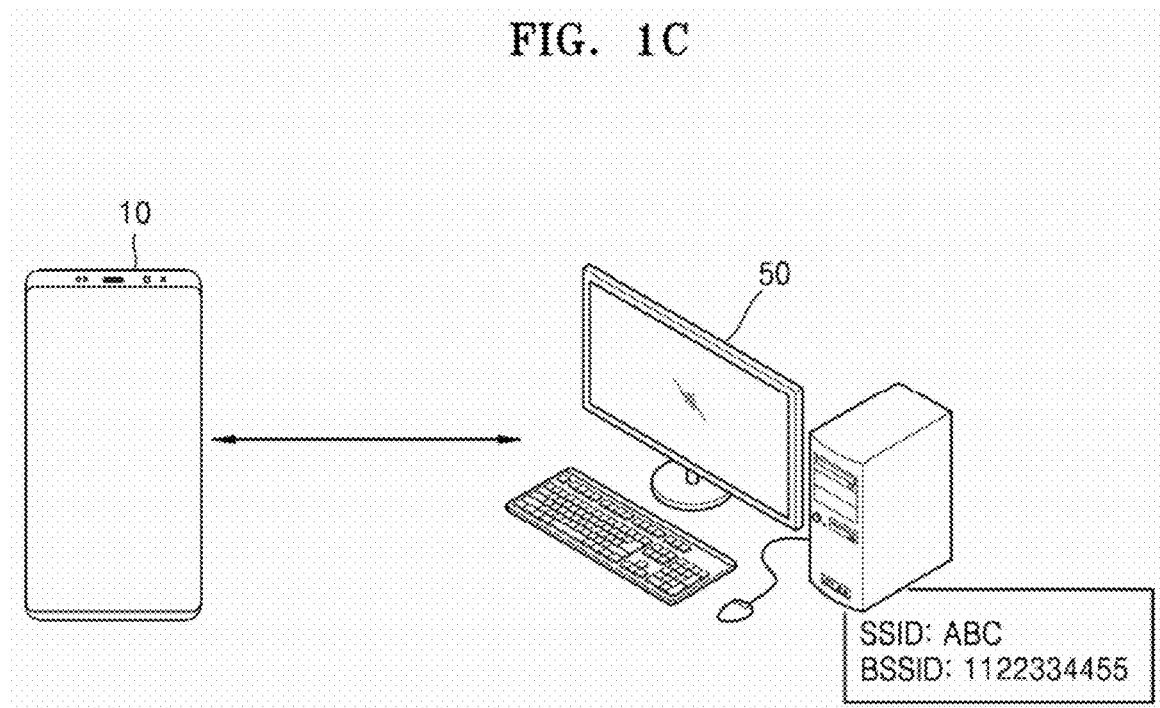

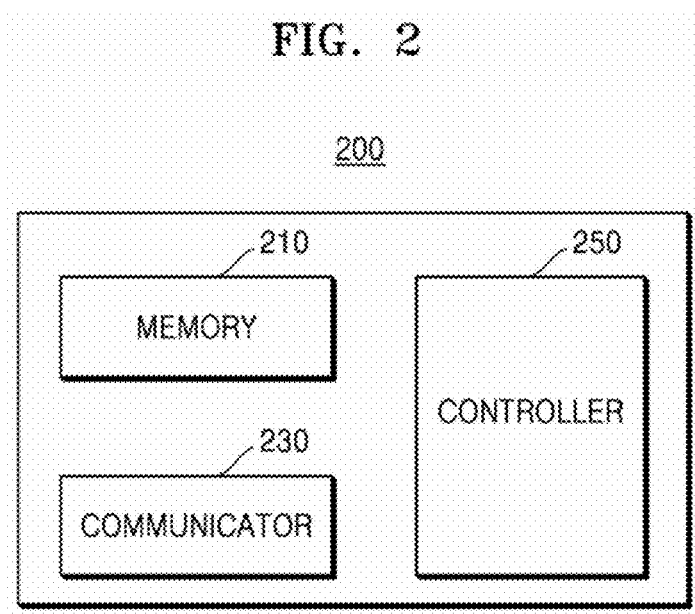

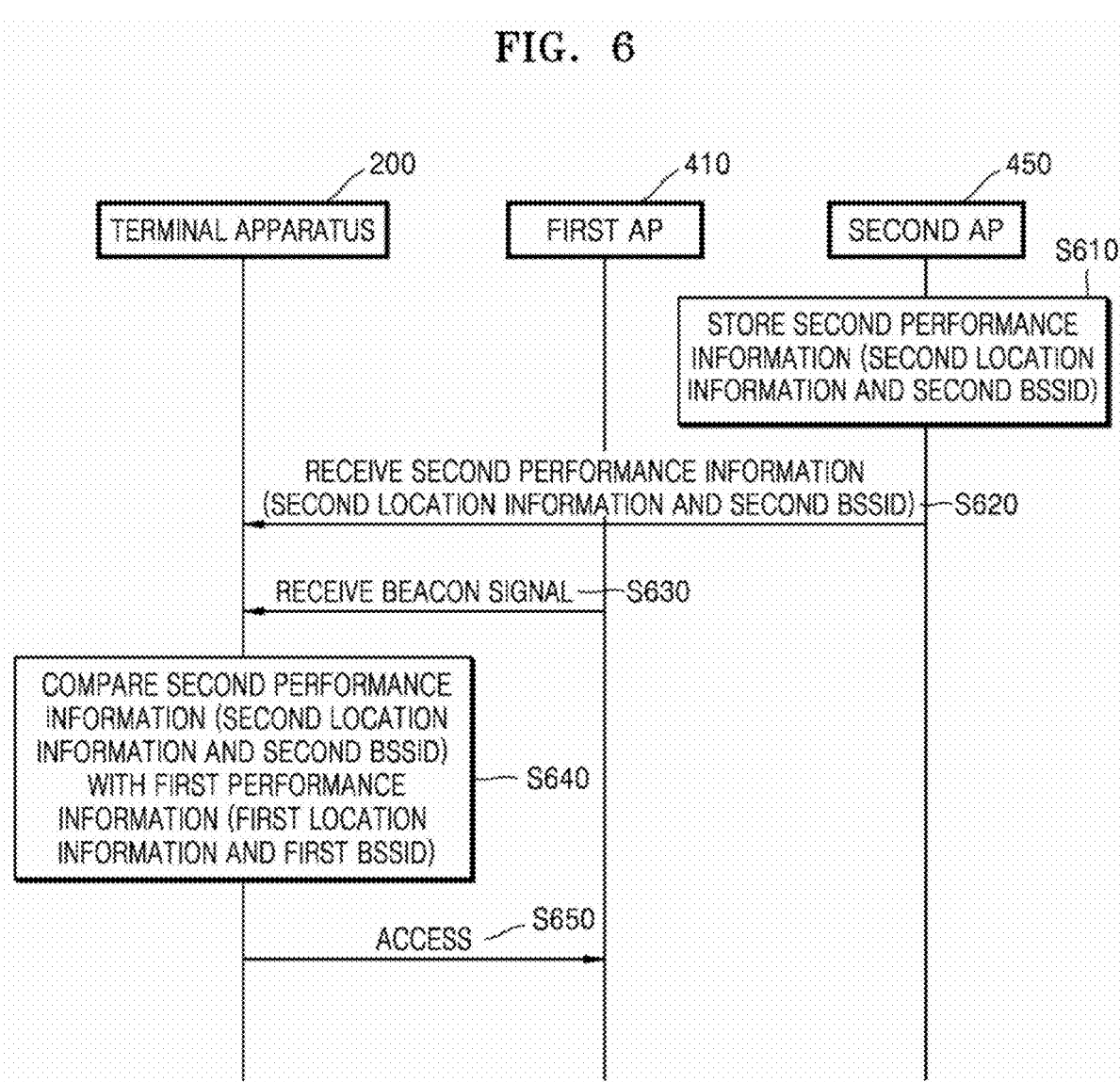

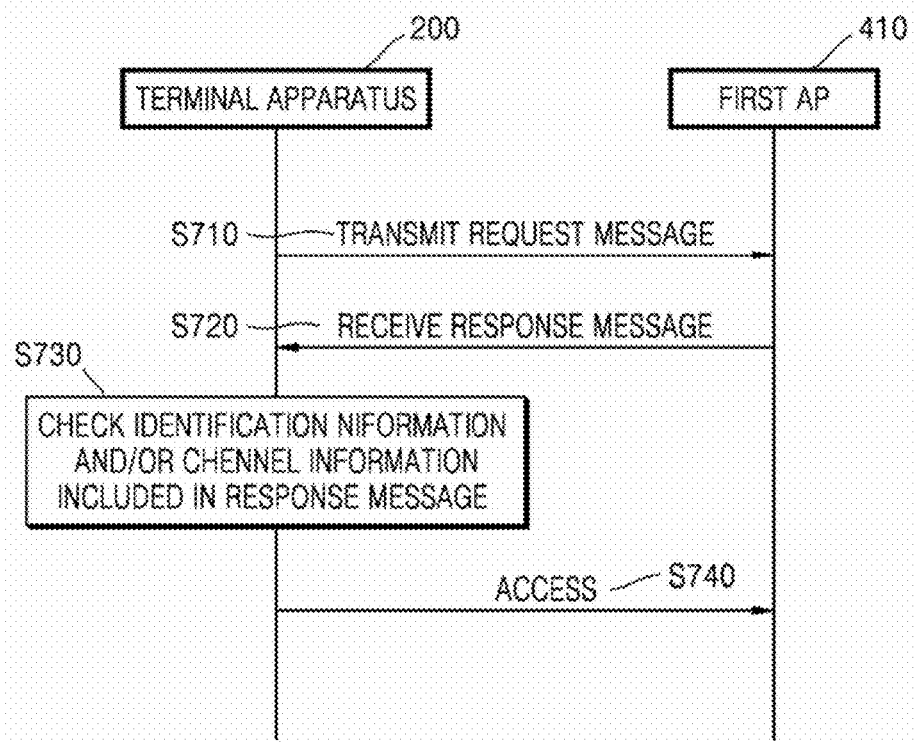

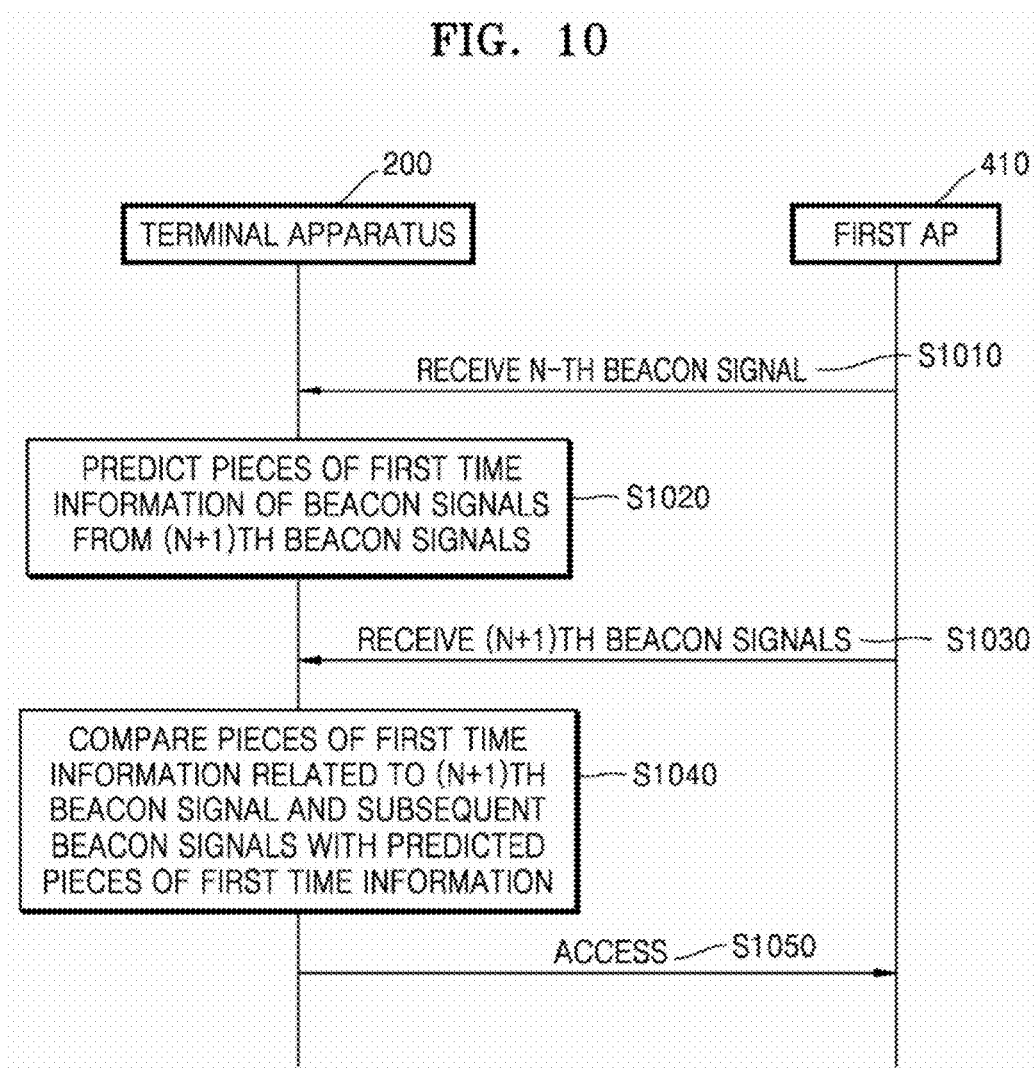

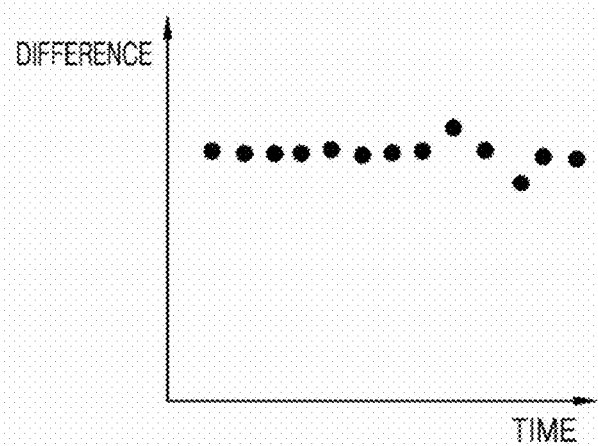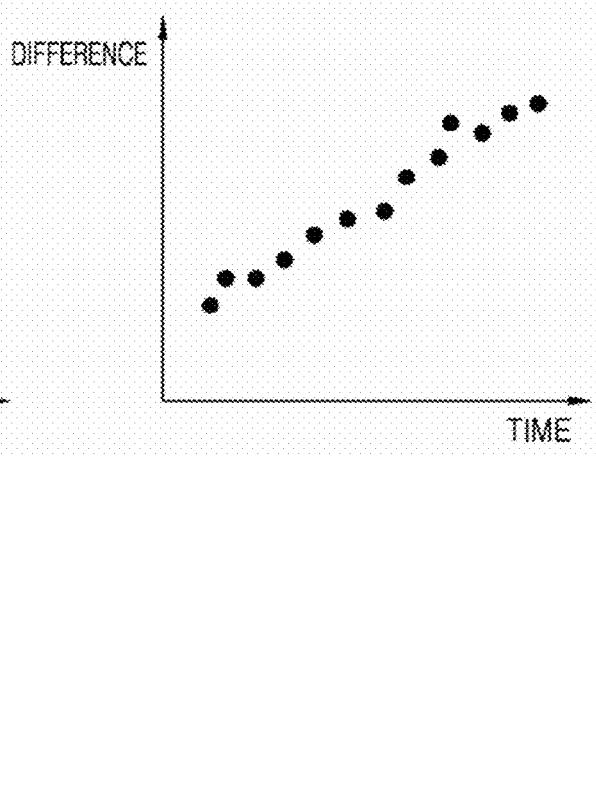

TERMINAL DEVICE AND METHOD FOR IDENTIFYING MALICIOUS AP BY USING SAME

TECHNICAL FIELD

The present disclosure relates to a communication field, and more particularly, to a method and apparatus for determining whether an access point (AP) to be accessed by a terminal apparatus is malicious or normal.

BACKGROUND ART

With the developments of mobile device and network technologies, users are able to use the Internet by accessing an access point (AP) with their mobile devices anytime and anywhere. However, when users access an AP in public places such as hotels, restaurants, airports, and the like, there may be problems with stability. For example, some hackers induce users to access a malicious AP, then use the information collected through the malicious AP for phishing, or collect sensitive personal information without permission.

Although users may be able to identify APs using a service set identifier (SSID) and a basic service set identifier (BSSID), if a hacker spoofs the AP's SSID and BSSID, it is almost impossible to determine which AP is safe. Accordingly, in respect of various types of malicious APs, there is a need for a method that allows users to access only normal APs.

DESCRIPTION OF EMBODIMENTS

Technical Problem

Provided are a terminal apparatus and a method of identifying a malicious access point (AP) using the terminal apparatus, whereby whether an AP to be accessed is a normal AP or a malicious AP may be determined.

Furthermore, provided are a terminal apparatus and a method of identifying a malicious AP by using the terminal apparatus, whereby leakage of personal information through a malicious AP may be prevented.

Technical Solution to Problem

According to an aspect of the present disclosure, a method of identifying a malicious AP by a terminal apparatus includes obtaining first performance information related to hardware of a first AP based on a first beacon signal received from the first AP, comparing the first performance information with previously stored second performance information of a second AP, and determining whether the first AP is a malicious AP, based on a result of the comparing.

Advantageous Effects of Disclosure

In the terminal apparatus and the method of identifying a malicious access point using the terminal apparatus according to an embodiment, whether an AP to be accessed is a normal AP or a malicious AP may be determined.

Furthermore, in the terminal apparatus and the method of identifying a malicious AP by using the terminal apparatus according to an embodiment, leakage of personal information through a malicious AP may be prevented.

However, the effects achieved by the terminal apparatus and the method of identifying a malicious AP by using the terminal apparatus according to an embodiment are not limited to the contents disclosed herein, and other various effects that are not mentioned herein would be clearly understood by a person skilled in the art from the description of the present invention.

BRIEF DESCRIPTION OF DRAWINGS

In order to more fully understand the drawings cited in the present specification, a brief description of each drawing is provided below.

FIG. 1A illustrates an example in which a user equipment accesses a malicious AP.

FIG. 1C illustrates another example in which a user equipment accesses a malicious AP.

FIG. 2 is a block diagram of a configuration of a terminal apparatus according to an embodiment.

FIG. 6 is a flowchart of a malicious AP identification method of a terminal apparatus, according to an embodiment.

FIG. 7 is a flowchart of a malicious AP identification method of a terminal apparatus, according to another embodiment.

FIGS. 8A and 8B illustrate a result of analysis of a response message received from a normal AP and a response message received from a malicious AP.

FIGS. 9A and 9B illustrate a result of analysis of a response message received from a normal AP and a response message received from a malicious AP.

FIG. 10 is a flowchart of a malicious AP identification method of a terminal apparatus, according to another embodiment.

FIGS. 11A and 11B illustrate a result of analysis of pieces of timestamp information of beacon signals received from a normal AP and pieces of timestamp information of beacon signals received from a malicious AP.

BEST MODE

Figure 1B:
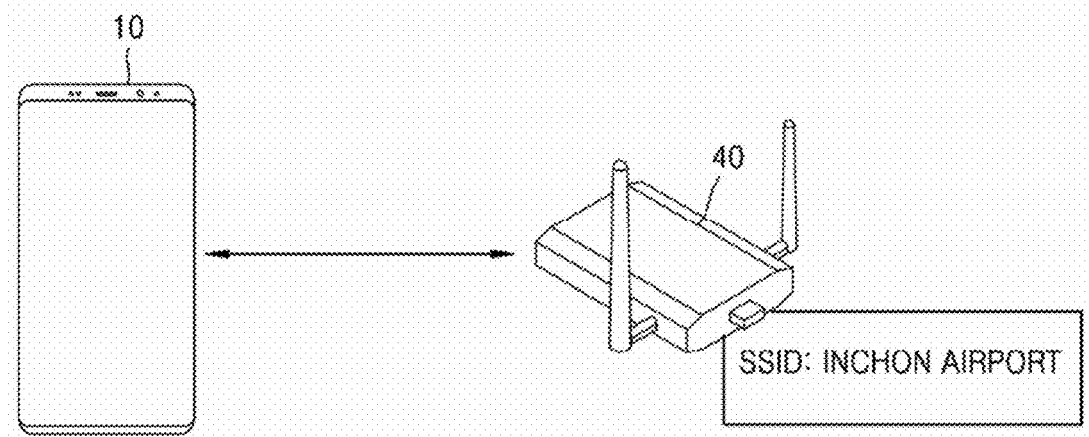
FIG. 1B illustrates another example in which a user equipment accesses a malicious AP.

According to one aspect of the disclosure, a method of identifying a malicious AP by a terminal apparatus includes obtaining first performance information related to hardware of a first AP based on a first beacon signal received from the first AP, comparing the first performance information with previously stored second performance information of a second AP, and determining whether the first AP is a malicious AP, based on a result of the comparing.

The method may further include obtaining first time information related to the first beacon signal, comparing the first time information with second time information related to a second beacon signal of the second AP, and determining whether the first AP is a malicious AP, based on a result of the comparing.

The first time information may include first timestamp information included in the first beacon signal and first receiving time information of the first beacon signal, the second time information may include second timestamp information included in the second beacon signal and second receiving time information of the second beacon signal, and the determining of whether the first AP is a malicious AP may include determining the first AP to be a malicious AP when a difference value between the first timestamp information and the second timestamp information does not correspond to a difference value between the first receiving time information and the second receiving time information.

The first AP may be an AP to be accessed by the terminal apparatus after the terminal apparatus is disconnected from the second AP, and identification information of the first AP may be the same as identification information of the second AP.

The comparing of the first performance information with the previously stored second performance information of the second AP may include, when an SSID of the first AP is included in a previously stored SSID list, comparing second performance information of the second AP received from a server device with the first performance information.

The method may further include transmitting, to the first AP, a request message including at least one of predetermined identification information and predetermined channel information, receiving a response message from the first AP in response to the request message, and determining the first AP to be a malicious AP, when the response message includes at least one of the predetermined identification information and the predetermined channel information.

The method may further include predicting pieces of first time information on or after an (n+1)th beacon signal, based on the pieces of first time information related to the first beacon signals received from the first AP on or before an n-th beacon signal, where n is a natural number, comparing the predicted pieces of first time information with the pieces of first time information of the first beacon signals received on or after the (n+1)th beacon signal, and determining whether the first AP is a malicious AP, based on a result of the comparing.

The predicting of the pieces of first time information may include predicting the pieces of first time information on or after the (n+1)th beacon signal through a linear regression analysis.

The determining of whether the first AP is a malicious AP may include determining the first AP to be a malicious AP when difference values between the predicted pieces of first time information and the pieces of first time information of the first beacon signals received on or after the (n+1)th beacon signal increase or decrease according to time.

The method may further include comparing a first arrangement order of information elements in the first beacon signal with a previously stored second arrangement order of information elements, and determining whether the first AP is a malicious AP, based on a result of the comparing.

According to another aspect of the disclosure, a terminal apparatus includes a memory storing one or more instructions, and a processor configured to execute the one or more instructions stored in the memory, wherein the processor is configured to obtain first performance information related to hardware of the first AP based on a first beacon signal received from the first AP, compare the first performance information with previously stored second performance information of the second AP, and determine whether the first AP is a malicious AP, based on a result of the comparing.

The processor may be configured to obtain first time information related to the first beacon signal, compare the first time information with second time information related to a second beacon signal of the second AP, and determine whether the first AP is a malicious AP, based on a result of the comparing.

The processor may be configured to transmit, to the first AP, a request message including at least one of predetermined identification information and predetermined channel information, receive a response message from the first AP in response to the request message, and determine the first AP to be a malicious AP, when the response message includes at least one of the predetermined identification information and the predetermined channel information.

The processor may be configured to predict pieces of first time information on or after an (n+1)th beacon signal, based on the pieces of first time information related to the first beacon signals received from the first AP on or before an n-th beacon signal, where n is a natural number, compare the predicted pieces of first time information with the pieces of first time information of the first beacon signals received on or after the (n+1)th beacon signal, and determine whether the first AP is a malicious AP, based on a result of the comparing.

MODE OF DISCLOSURE

In the present disclosure, various embodiments of the disclosure will be described with reference to the accompanying drawings. However, it should be understood that the disclosure is not limited to these particular embodiments but also includes various modifications, equivalents, and/or alternatives thereof.

In the following description, when detailed descriptions about related well-known functions or structures are determined to make the gist of the disclosure unclear, the detailed descriptions will be omitted herein Furthermore, a number, for example, first, second, and the like, used in the description of an embodiment are merely an identification sign to distinguish one constituent element from another constituent element.

Furthermore, in the specification, when a constituent element "connects" or is "connected" to another constituent element, the constituent element contacts or accesses the other constituent element directly or through at least one of other constituent elements.

Furthermore, in the present specification, a constituent element expressed by "unit", "module", and the like may be include two or more constituent elements that are incorporated into one constituent element or one constituent element that is split into two or more constituent elements for each detailed function. Furthermore, each of the constituent elements to be described below may additionally perform some or all of the functions of other constituent elements in addition to a main function thereof, and some of the main functions of each constituent element may be exclusively performed by other constituent elements.

Furthermore, in the present disclosure, an "access point (AP)", which is a device that mediates network access of a terminal apparatus, may include, for example, a Wi-Fi device.

Furthermore, in the present disclosure, "identification information of an AP" may include at least one of a service set identifier (SSID) and a basic service set identifier (BSSID) to identify an AP.

Hereinafter, embodiments according to the technical concept of the present disclosure are sequentially described in detail.

FIGS. 1A, 1B, and 1C illustrate an example in which a user equipment 10 accesses a malicious AP.

As described above, hackers induce the user equipment 10 to access a malicious AP and capture user's personal information.

First, referring to FIG. 1A, when the user equipment 10 accesses a normal AP 20, a malicious AP 30 having the same identification information as the normal AP 20 transmits deauthentication packets to the user equipment 10 and the normal AP 20. The user equipment 10 and the normal AP 20 having received the deauthentication packets are disconnected from each other. Although most packets transceived between the user equipment 10 and the normal AP 20 are encrypted, as the deauthentication packet is not encrypted, the malicious AP 30 may transmit fake deauthentication packets to the user equipment 10 and the normal AP 20 to disconnect the user equipment 10 and the normal AP 20 from each other. After the user equipment 10 and the normal AP 20 are disconnected from each other, the malicious AP 30 increases signal intensity to allow the user equipment 10 to access the malicious AP 30 instead of the normal AP 20. From the standpoint of the user equipment 10, as identification information of the normal AP 20 and identification information of the malicious AP 30 are the same, the user equipment 10 simply accesses the malicious AP 30 having relatively large signal intensity, without knowing that the normal AP 20 and the malicious AP 30 are different from each other.

Next, referring to FIG. 1B, identification information of a malicious AP 40 is set to be identification information of a reliable public AP. Users may misunderstand the malicious AP 40 to be a public AP from the identification information of the malicious AP 40, and thus the users may allow the user equipment 10 to access the malicious AP 40.

Next, referring to FIG. 10, a malicious AP is driven, based on software, in a computer 50, for example, a notebook computer, a desktop computer, and the like. Users may access the computer 50 by misunderstanding the malicious AP to be a normal AP.

The examples described with reference to FIGS. 1A to 1C are all generated because the user equipment 10 identifies an AP based on the identification information. Accordingly, a method of detecting a malicious AP based on information other than the identification information of an AP is needed.

FIG. 2 is a block diagram of a configuration of a terminal apparatus 200 according to an embodiment.

Referring to FIG. 2, the terminal apparatus 200 may include a memory 210, a communicator 230, and a controller 250. The memory 210, the communicator 230, and the controller 250 may be implemented by at least one processor. The controller 250 may perform an identification operation of a malicious AP that is described below by executing one or more instructions stored in the memory 210.

The memory 210 may store pieces of information to determine whether a first AP to be accessed by the terminal apparatus 200 corresponds to a malicious AP. The first AP means an AP that is to be accessed by the terminal apparatus 200 and is not yet determined to be normal or malicious. Pieces of information for determining whether the first AP corresponds to a malicious AP may include, for example, at least one of performance information, time information, location information, and identification information of a second AP corresponding to a normal AP. A method of determining whether the first AP corresponds to a malicious AP on the basis of at least one of performance information, time information, location information, and identification information of the second AP is described below.

The communicator 230, under the control of the controller 250, may access the first AP and/or the second AP or disconnected from the first AP and/or the second AP. Furthermore, the communicator 230 may transceive data with the first AP and/or the second AP. The communicator 230 may access the Internet through the first AP and/or the second AP. The communicator 230 may operate according to, for example, IEEE 802.11 standards.

The controller 250 may determine whether the first AP is a malicious AP based on the information stored in the memory 210 and the information received from the first AP, and control the connection between the communicator 230 and the first AP according to a result of determination. When the first AP is a malicious AP, the controller 250 may disconnect the communicator 230 from the first AP, and when the first AP is a normal AP, the controller 250 may allow the communicator 230 to access the first AP.

In an embodiment, the terminal apparatus 200 may include a notebook computer, a smartphone, a tablet PC, a wearable device, and the like, which are capable of communicating with an external device through an AP, but the disclosure is not limited thereto.

Figure 3:
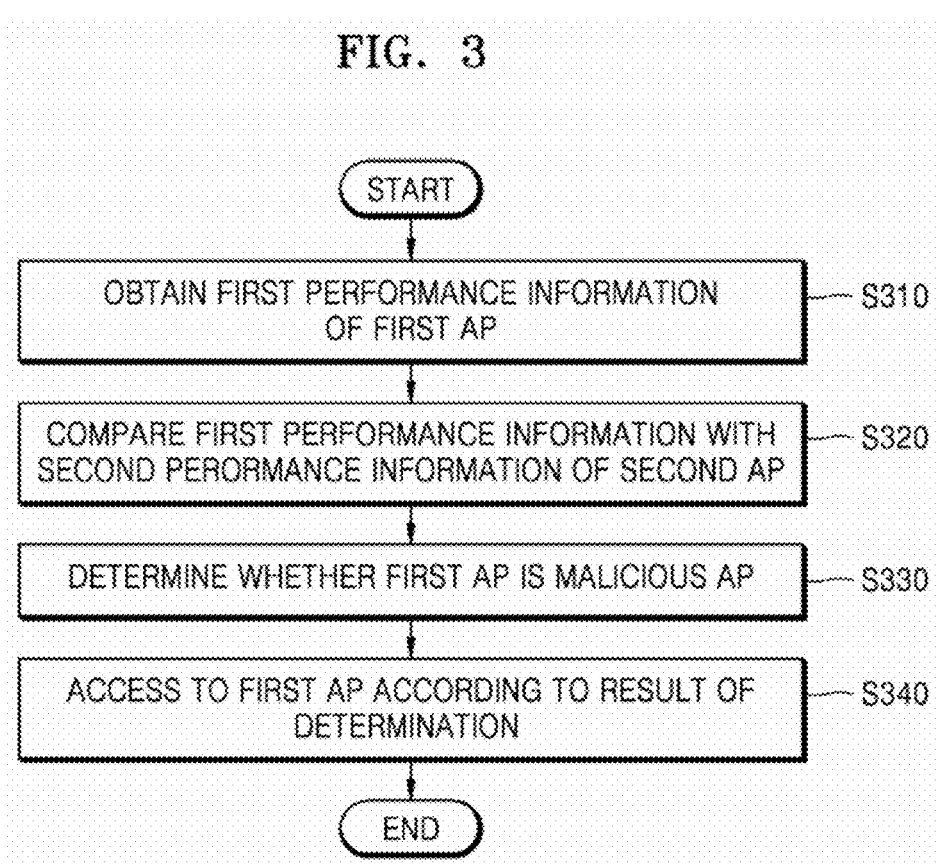
FIG. 3 is a flowchart of a malicious AP identification method according to an embodiment.

FIG. 3 is a flowchart of a malicious AP identification method of the terminal apparatus 200, according to an embodiment.

In operation S310, the controller 250 obtains first performance information related to hardware of the first AP based on a beacon signal received from the first AP to access.

The performance information of an AP is information regarding performance exerted based on the hardware of an AP and may include, for example, an allowable bitrate, AP's coverage, channel information, power information, high-throughput (HT) performance information, and the like, but the disclosure is not limited thereto.

In operation S320, the controller 250 compares the first performance information with previously stored second performance information of the second AP. The second AP means an AP that is determined by the terminal apparatus 200 to be a normal AP or confirmed by an external server to be a normal AP.

In operation S330, the controller 250 may determine whether the first AP is a malicious AP, on the basis of a result of the comparing in operation S320.

When the first performance information corresponds to the second performance information, the controller 250 may determine that the first AP is a normal AP. Furthermore, when the first performance information does not response to the second performance information, the controller 250 may determine that the first AP is a malicious AP.

When the first AP is the same as the second AP, the first performance information and the second performance information are also the same. Accordingly, when the first performance information corresponds to the second performance information, the terminal apparatus 200 determines the first AP to be a normal AP.

In operation S340, when the first AP is determined to be normal, the controller 250 controls the communicator 230 to access the first AP. The communicator 230 may communicate with an external device through the first AP. When the first AP is determined to be malicious, the controller 250 blocks access to the first AP by the communicator 230.

As the performance information of an AP includes pieces of information related to hardware of the AP and a beacon signal is generated from firmware of the AP, it may be difficult for a hacker to manipulate performance information. Accordingly, in an embodiment, by comparing the performance information of a normal AP with performance information of an AP to access, it is determined whether the AP to access is a malicious AP.

In the following description, referring to FIGS. 4 to 11, a method of identifying a malicious AP by the terminal apparatus 200 is described in detail.

Figure 4:
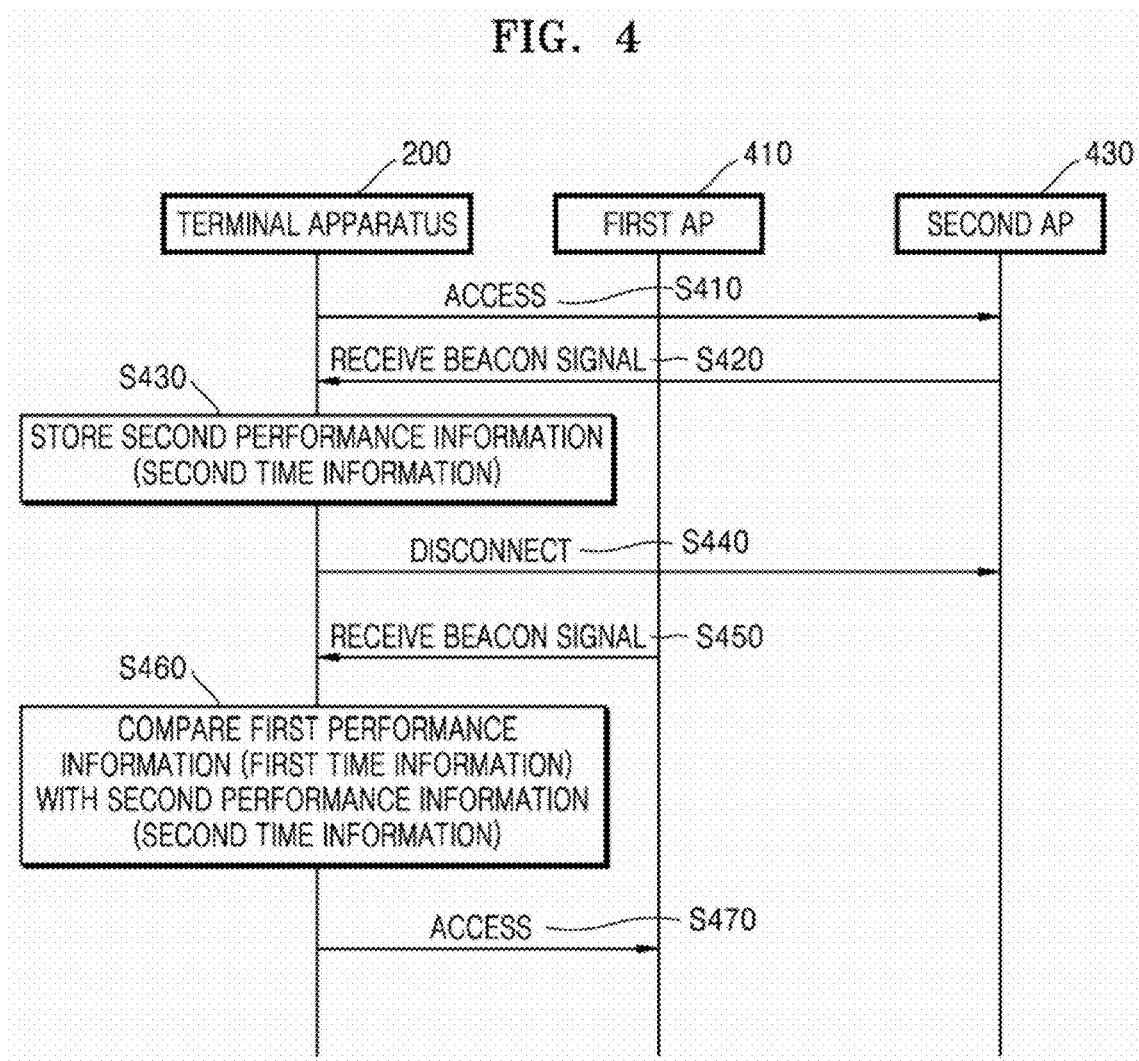
FIG. 4 is a flowchart of a malicious AP identification method of a terminal apparatus, according to an embodiment.

FIG. 4 is a flowchart of a malicious AP identification method of the terminal apparatus 200, according to an embodiment.

First, the terminal apparatus 200 accesses a second AP 430, not a malicious AP (S410). The terminal apparatus 200 may communicate with an external device, for example, a server, through the second AP 430.

The terminal apparatus 200 receives a beacon signal from the second AP 430 (S420), and obtains second performance information related to hardware of the second AP 430 from the beacon signal and stores the obtained information (S430). Although FIG. 4 illustrates that the terminal apparatus 200 receives the beacon signal from the second AP 430 after having access to the second AP 430, the terminal apparatus 200 may receive the beacon signal before the access to the second AP 430. This is because the beacon signal is a signal broadcasted from an AP regardless of whether the terminal apparatus 200 accesses the AP.

Figure 5:
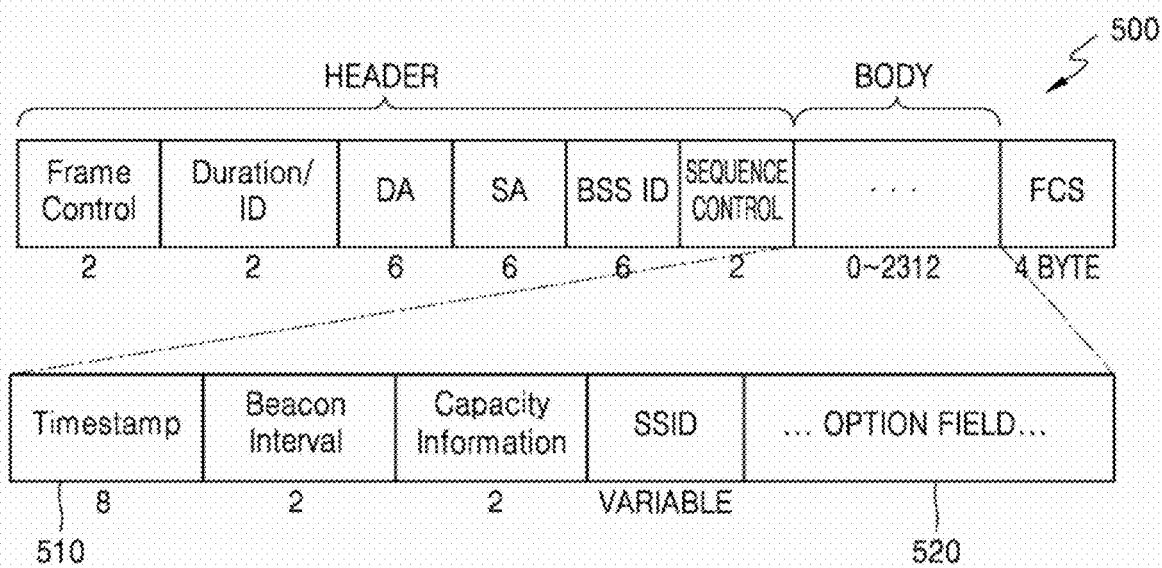
FIG. 5 illustrates an example of a structure of a beacon signal.

FIG. 5 illustrates an example of a structure of a beacon signal 500. Referring to FIG. 5, the beacon signal 500 may include a header and a body. The body may include a timestamp field 510, an option field 520, and the like, and the timestamp field 510 may include time information related to the beacon signal 500, for example, generation time information of the beacon signal 500. Furthermore, the option field 520 may include information elements, and the above-described performance information of the AP may be included in the information elements.

Referring back to FIG. 4, in an embodiment, the terminal apparatus 200 may store the second time information based on the beacon signal of the second AP 430 (S430). The second time information may include at least one of second timestamp information included in the beacon signal of the second AP 430 and second receiving time information indicating a receiving time of the beacon signal of the second AP 430.

After storing the second performance information, the terminal apparatus 200 remove the access to the second AP 430 (S440). As described above, the terminal apparatus 200 may remove the access to the second AP 430 according to the deauthentication packets received from the first AP 410.

The terminal apparatus 200 receives a beacon signal from the first AP 410 to access (S450), and compares first performance information of the first AP 410 obtained from the received beacon signal with the previously stored second performance information (S460). Although FIG. 3 illustrates that, after the terminal apparatus 200 and the second AP 430 are disconnected from each other, the beacon signal is received from the first AP 410. The beacon signal may be received from the first AP 410 before the terminal apparatus 200 is disconnected from the second AP 430. As described above, this is because the beacon signal is a signal broadcasted from the AP regardless of whether the terminal apparatus 200 accesses the AP.

In an embodiment, the terminal apparatus 200 may obtain first time information from the beacon signal of the first AP 410. The first time information may include at least one of first timestamp information included in the beacon signal of the first AP 410 and first receiving time information indicating a receiving time of the beacon signal of the first AP 410.

When the first performance information corresponds to the second performance information, the terminal apparatus 200 determines the first AP 410 to be a normal AP, and accesses the first AP 410 (S470). When the first performance information does not correspond to the second performance information, the terminal apparatus 200 may not access the first AP 410. As described above, when the first AP 410 is the same as the second AP 430, the first performance information is identical to the second performance information, and thus when the first performance information corresponds to the second performance information, the terminal apparatus 200 determines the first AP 410 to be a normal AP.

In an embodiment, when the first time information corresponds to the second time information, the terminal apparatus 200 may access the first AP 410. Whether the first time information corresponds to the second time information may be based on the first timestamp information, the first receiving time information, the second timestamp information, and the second receiving time information.

In detail, when a difference value between the first timestamp information and the second timestamp information does not correspond to a difference value between the first receiving time information and the second receiving time information, the terminal apparatus 200 may determine the first AP 410 to be a malicious AP. For example, when the difference value between the first timestamp information and the second timestamp information is not identical to the difference value between the first receiving time information and the second receiving time information, the terminal apparatus 200 may determine the first AP 410 to be a malicious AP. Alternatively, when the difference value between the first timestamp information and the second timestamp information is different by a preset value or more from the difference value between the first receiving time information and the second receiving time information, the terminal apparatus 200 may determine the first AP 410 to be a malicious AP As the AP cyclically broadcasts a beacon signal, when the first AP 410 and the second AP 430 are the same, the difference value between the first timestamp information and the second timestamp information needs to be identical to the difference value between the first receiving time information and the second receiving time information. However, the two difference values being different from each other means that the first AP 410 is a malicious AP.

In another example, when the difference value between the first timestamp information and the first receiving time information does not correspond to the difference value between the second timestamp information and the second receiving time information, the terminal apparatus 200 may determine the first AP 410 to be a malicious AP. For example, when the difference value between the first timestamp information and the first receiving time information is not identical to the difference value between the second timestamp information and the second receiving time information, the terminal apparatus 200 may determine the first AP 410 to be a malicious AP. Alternatively, when the difference value between the first timestamp information and the first receiving time information is different by a preset value or more from the difference value between the second timestamp information and the second receiving time information, the terminal apparatus 200 may determine the first AP 410 to be a malicious AP.

The difference value between the first timestamp information and the first receiving time information corresponds to a distance between the terminal apparatus 200 and the first AP 410, and the difference value between the second timestamp information and the second receiving information corresponds to a distance between the terminal apparatus 200 and the second AP 430. In this regard, when the two difference values do not correspond to each other, the terminal apparatus 200 may determine the first AP 410 to be a malicious AP.

The terminal apparatus 200 may determine whether the first AP 410 is a malicious AP, on the basis of a result of the comparing between the first performance information and the second performance information and a result of the comparing between the first time information and the second time information.

FIG. 6 is a flowchart of a malicious AP identification method of the terminal apparatus 200 according to an embodiment.

A server 450 stores pieces of second performance information of the second APs corresponding to a normal AP (S610). The server 450 may further store pieces of second location information and second BSSIDs of the second APs. The server 450 may receive and previously store at least one of pieces of second performance information, pieces of second location information, and second BSSIDs of the second Aps from pieces of user equipment that access the second Aps. The second location information may include GPS coordinate information indicating an installation location of the second AP, but the disclosure is not limited thereto.

The terminal apparatus 200 may receive, from the server 450, the pieces of second performance information of the second APs (S620). The terminal apparatus 200 may further receive the pieces of second location information and the second BSSIDs of the second APs. The terminal apparatus 200 may receive a SSID list of the second APs from the server 450.

The terminal apparatus 200 receives a beacon signal from the first AP 410 to access (S630), and obtains the first performance information of the first AP 410 from the beacon signal. The terminal apparatus 200 may further obtain first location information and first BSSID of the first AP 410. The pieces of first location information may include GPS coordinate information indicating installation location of the first AP 410, but the disclosure is not limited thereto.

The terminal apparatus 200 compares the first performance information with the second performance information (S640), and accesses the first AP 410 according to a result of the comparing (S650). When the first performance information corresponds to the second performance information, the terminal apparatus 200 may access the first AP 410. When the first performance information does not correspond to the second performance information, the terminal apparatus 200 may not access the first AP 410.

In an embodiment, when at least one of the first location information and the first BSSID does not correspond to at least one of the second location information and the second BSSID, the terminal apparatus 200 may not access the first AP 410.

Furthermore, in an embodiment, when any one of the first performance information, the first location information, and the first BSSID does not correspond to the second performance information, the second location information, and the second BSSID, the terminal apparatus 200 may not access the first AP 410.

The embodiment of FIG. 6 may be effective when the first AP 410 is disguised as a public AP. As described above, as a malicious AP disguised as a public AP may have an SSID of the public AP, when the SSID of the first AP 410 is included in an SSID list of public APs, the terminal apparatus 200 may compare the pieces of performance information of public Aps received from the server 450 with the performance information of the first AP 410 and determine whether the first AP 410 is a malicious AP.

FIG. 7 is a flowchart of a malicious AP identification method of the terminal apparatus 200 according to another embodiment.

An embodiment related to FIG. 7 and FIG. 10 that is described below may be effective for blocking the access to a malicious AP implemented by the software described in FIG. 1C.

Referring to FIG. 7, the terminal apparatus 200 transmit a request message, for example, a probe request packet, to the first AP 410 (S710). The terminal apparatus 200 may include, in the request message, at least one of identification information, for example, the SSID of the terminal apparatus 200, and channel information. The number of pieces of identification information included in the request message may be one or more, and the number of channel information included in the request message may be one or more. In an example, the identification information and the channel information included in the request message may be fake information. In other words, not actual identification information of the terminal apparatus 200 and channel information that is not actually used by the terminal apparatus 200, but randomly determined identification information and channel information may be included in the request message.

The terminal apparatus 200 receives, from the first AP 410, a response message, for example, a probe response packet, as a response to the request message (S720), and checks at least one of the identification information and the channel information included in the response message (S730).

When at least one of the identification information and the channel information included in the request message is included in the response message, the terminal apparatus 200 blocks the access to the first AP 410, and when the identification information and the channel information included in the request message is not included in the response message, the terminal apparatus 200 may access the first AP 410 (S740).

As a response message is not generated by firmware at a software-based malicious AP, the response message may contain some errors. For example, some software-based malicious Aps may generate a response message by using the request message received from the terminal apparatus 200 without change. Accordingly, in an embodiment, when the identification information and channel information included in the request message is included in the response message without change, the first AP 410 may be determined to be a malicious AP.

In an embodiment, when the response message includes a plurality of pieces of identification information or a plurality of pieces of channel information, the terminal apparatus 200 may determine the first AP 410 to be a malicious AP and block the access to the first AP 410. In general, the response message includes the identification information and the channel information of an AP. However, as described above, when a malicious AP uses the request message in the generation of a response message, the response message may include a plurality of pieces of identification information or a plurality of pieces of channel information.

Figures 8A, 8B:
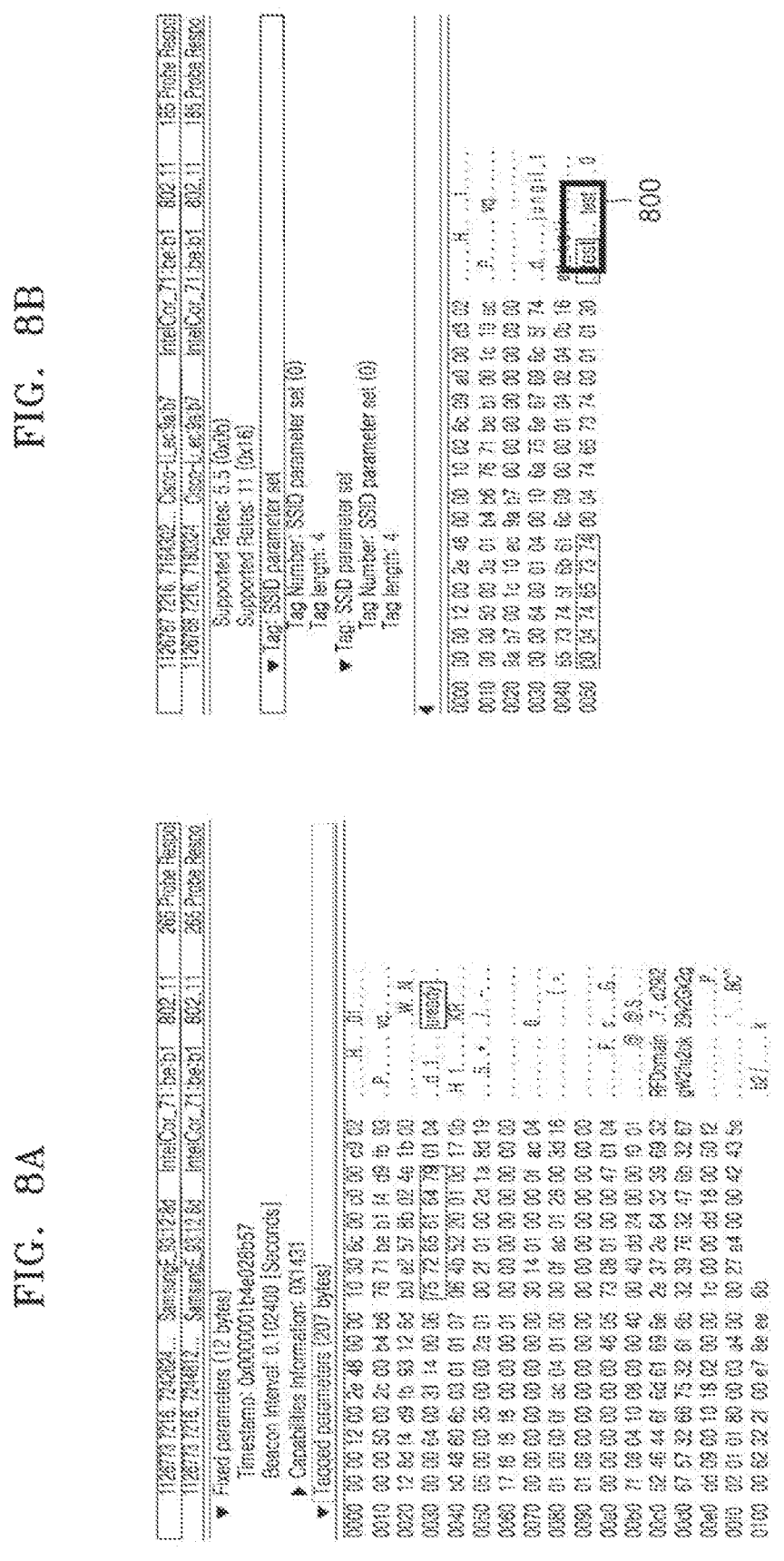

FIGS. 8A, 8B, 9A and 9B illustrate results of analysis of a response message received from a normal AP and a response message received from a malicious AP When the terminal apparatus 200 transmits a request message including an SSID that is "test" to an AP, FIG. 8A shows a result of analysis of a response message received from a normal AP, and FIG. 8B shows a result of analysis of a response message received from a malicious AP. Referring to FIG. 8B, it may be seen that the response message received from a malicious AP includes an SSID 800 that is "test".

Figures 9A, 9B:
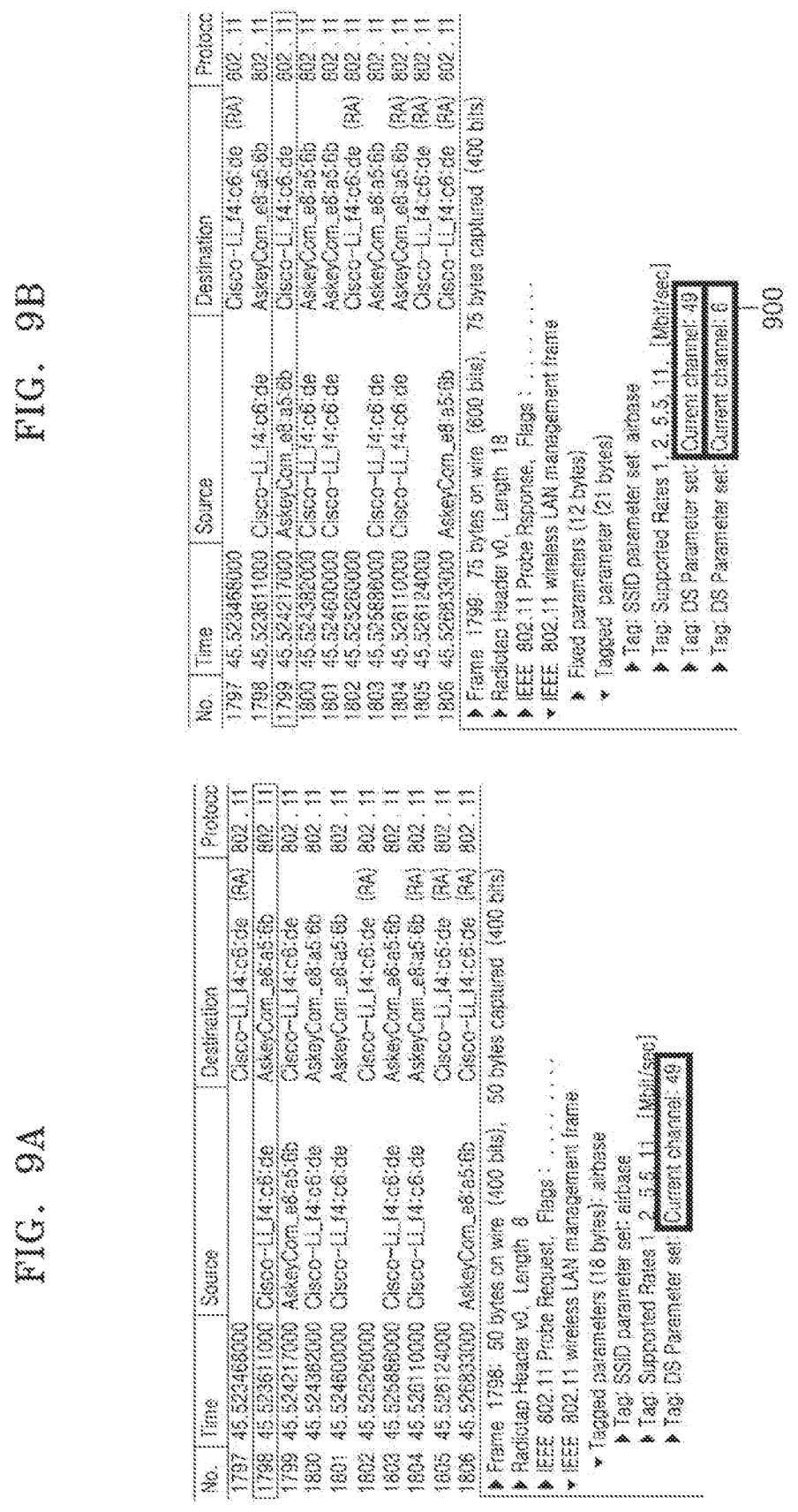

Furthermore, when the terminal apparatus 200 transmits a request message including channel information that is "49" to an AP, FIG. 9A shows a result of analysis of a response message received from a normal AP, and FIG. 9B shows a result of analysis of a response message received from a malicious AP. Referring to FIG. 9B, it may be seen that a response message received from a malicious AP includes channel information 900 that are "6" and "49". The channel information "49" is fake information that is not used in the IEEE 802.11 standards.

In other words, it may be seen that the response message received from a malicious AP includes the SSID "test" included in the request message and the channel information "49".

FIG. 10 is a flowchart of a malicious AP identification method of the terminal apparatus 200 according to another embodiment.

The terminal apparatus 200 receives an n-th beacon signal, where n is a natural number, from the first AP 410 (S1010). Then is a natural number greater than 1. The n may beam the order that the terminal apparatus 200 receives beacon signals broadcasted by the first AP 410.

The terminal apparatus 200 may predict pieces of first time information on or after an (n+1)th beacon signal, based on the pieces of first time information related to the beacon signals received on or before the n-th beacon signal (S1020). The first time information may include first timestamp information included in the beacon signal or first receiving time information indicating the receiving time of a beacon signal. As timestamp values of beacon signals that are cyclically broadcasted increase as time passes, the terminal apparatus 200 may predict the pieces of first time information after the n-th beacon signal, based on the pieces of first time information related to the beacon signals received on or before the n-th beacon signal. In an example, the terminal apparatus 200 may predict the pieces of first time information through linear regression analysis. As the timestamp values included in the beacon signals increase linearly as according to the time, various algorithms capable of predicting future timestamp values may be used.

The terminal apparatus 200 receives the (n+1)th beacon signal and the subsequent beacon signals from the first AP 410 (S1030). The terminal apparatus 200 compares the pieces of first time information related to the (n+1)th beacon signal and the subsequent beacon signals with the predicted pieces of first time information (S1040).

When a difference values between the predicted pieces of first time information and the pieces of first time information of the beacon signals received on or after the (n+1)th beacon signal increases or decreases according to the time, the terminal apparatus 200 may determine the first AP 410 to be a malicious AP. As described above, for a normal AP, as the beacon signals are generated by firmware that controls hardware, the generation cycle or timestamp values of beacon signals is accurate, but for a software-based malicious AP, as the beacon signals are generated by an applied application, an error is highly likely to occur in the generation cycle or the timestamp values. In particular, the applied application for generating a beacon signal may be executed by a CPU, RAM, and the like of a computer, when the CPU, RAM, and the like of a computer is related to the execution of another applied application, an error may be easily generated in the beacon signal generation operation of an applied application and the setting operation of a timestamp value.

FIGS. 11A and 11B illustrate a result of analysis of pieces of timestamp information of beacon signals received from a normal AP and pieces of timestamp information of beacon signals received from a malicious AP.

As illustrated in FIG. 11A, for a normal AP, a difference value between predicted timestamp values and actual timestamp values shows constant tendency according to the time, but as illustrated in FIG. 11B, for a malicious AP, the difference value between predicted timestamp values and actual timestamp values may show increasing tendency according to the time. In other words, as illustrated in FIG. 11A, although, for a normal AP, an inclination of the difference value between predicted timestamp values and actual timestamp values is 0, as illustrated in FIG. 11B, for a malicious AP, the inclination of the difference value between predicted timestamp values and actual timestamp values may be greater than 0 or less than 0.

When the first AP 410 is determined to be a normal AP according to a result of the comparing, the terminal apparatus 200 accesses the first AP 410 (S1050), and when the first AP 410 is determined to be a malicious AP, the terminal apparatus 200 may block the access to the first AP 410.

In another embodiment, when a difference value between first time information of each of a plurality of beacon signals received from the first AP 410 and first time information of a directly previous beacon signal gradually increases or decreases according to the time, the terminal apparatus 200 may determine the first AP 410 to be a malicious AP. For example, a difference value between first time information of an (i−1)th beacon signal and first time information of an i-th beacon signal is constant according to the time. However, when the difference value gradually increases or decreases, the terminal apparatus 200 may determine the first AP 410 to be a malicious AP.

In another embodiment, the terminal apparatus 200 compares a first arrangement order of information elements in the beacon signals received from the first AP 410 with a previously stored second arrangement order of information elements, and when the first arrangement order corresponds to the second arrangement order, the terminal apparatus 200 may determine the first AP 410 to be a malicious AP.

The software-based malicious AP includes information elements in the beacon signals in the order set by software. The terminal apparatus 200 previously stores the order of information elements arranged by the software-based malicious AP, and compares the first arrangement order of information elements in the beacon signals of the first AP 410 with the previously stored second arrangement order, thereby determining whether the first AP 410 is a software-based malicious AP.

When the embodiments of FIGS. 7 and 10 are compared with each other, the embodiment of FIG. 7 may correspond to an active probing method in which the terminal apparatus 200 transmits a request message to the first AP 410, and the embodiment of FIG. 10 may correspond to a passive probing method in which a beacon signal received from the first AP 410 is analyzed.

The embodiments of FIGS. 7 and 10 may not be separately performed by the terminal apparatus 200, and the terminal apparatus 200 may determine whether the first AP 410 is a malicious AP, according to the embodiments of FIGS. 7 and 10. For example, the terminal apparatus 200 may finally determine the first AP 410 to be a normal AP when the first AP 410 is determined to be a normal AP according to the active probing method and the first AP 410 is determined to be a normal AP according to the passive probing method. The terminal apparatus 200 may finally determine the first AP 410 to be a normal AP when the first AP 410 is determined to be a malicious AP according to any one of the active probing method and the passive probing method.

Likewise, it is not that the embodiments of FIGS. 4, 6, 7, and 10 are separately performed by the terminal apparatus 200, but that the terminal apparatus 200 may determine whether the first AP 410 is a malicious AP according to at least one of the embodiments of FIGS. 4, 6, 7, and 10.

In an example, the terminal apparatus 200 may finally determine the first AP 410 to be a normal AP when the first AP 410 is determined to be a normal AP according to all of the embodiment of FIG. 4, the embodiment of FIG. 7, and the embodiment of FIG. 10. The terminal apparatus 200 may finally determine the first AP 410 to be a normal AP when the first AP 410 is determined to be a normal AP according to any one of the embodiment of FIG. 4, the embodiment of FIG. 7, and the embodiment of FIG. 10.

In another example, the terminal apparatus 200 may finally determine the first AP 410 to be a normal AP when the first AP 410 is determined to be a normal AP according to all of the embodiment of FIG. 6, the embodiment of FIG. 7, and the embodiment of FIG. 10. The terminal apparatus 200 may finally determine the first AP 410 to be a normal AP when the first AP 410 is determined to be a normal AP according to any one of the embodiment of FIG. 6, the embodiment of FIG. 7, and the embodiment of FIG. 10.

The embodiments of the disclosure can be written as computer programs and can be implemented in general-use digital computers that execute the programs using a computer readable recording medium.

In this state, the medium may continuously store a program that can be executed by a computer, or may temporarily store a program for execution or download. Furthermore, the medium may be various recording devices or storing devices in which single or several hardware are combined, which it not limited to a medium that directly accesses a computer system and may be present over a network in a distribution manner. Examples of the medium include magnetic storage media such as floppy disks or hard disks, optical recording media such as CD-ROMs or DVDs, magneto-optical medium such as floptical disks, and Rom, RAM, flash memory, etc., which are configured to store program instructions. Furthermore, examples of other media may include application stores for distributing applications, sites for supplying or distributing other various software, and recording media or storing media managed at servers.

While the disclosure has been particularly shown and described with reference to preferred embodiments using specific terminologies, the embodiments and terminologies should be considered in descriptive sense only and not for purposes of limitation. Therefore, it will be understood by those of ordinary skill in the art that various changes in form and details may be made therein without departing from the spirit and scope of the disclosure as defined by the following claims.

The invention claimed is:

1. A method of identifying a malicious access point (AP) by a terminal apparatus, the method comprising:
obtaining first information of a first AP based on a first beacon signal received from the first AP;
comparing the first information with previously stored second information of a second AP predefined as a normal AP; and
determining whether the first AP is a malicious AP, based on a result of the comparing,
wherein the first information includes first timestamp information included in the first beacon signal and first receiving time information of the first beacon signal,
wherein the second information includes second timestamp information included in a second beacon signal received from the second AP and second receiving time information of the second beacon signal, and
wherein the determining of whether the first AP is a malicious AP comprises determining the first AP to be a malicious AP based on a difference value between the first timestamp information and the second timestamp information being different from a difference value between the first receiving time information and the second receiving time information.

2. The method of claim 1, wherein the first AP is an AP to be accessed by the terminal apparatus after the terminal apparatus is disconnected from the second AP, and
identification information of the first AP is a same as identification information of the second AP.

3. The method of claim 1, wherein the previously stored second information of the second AP includes information of the second AP received from a server device, and a service set identifier (SSID) of the first AP is included in a SSID list stored in the terminal apparatus.

4. The method of claim 1, further comprising:
transmitting, to the first AP, a request message including at least one of predetermined identification information and predetermined channel information;
receiving a response message from the first AP in response to the request message; and
determining the first AP to be a malicious AP, when the response message includes at least one of the predetermined identification information and the predetermined channel information.

5. The method of claim 1, further comprising:
comparing a first arrangement order of information elements in the first beacon signal with a previously stored second arrangement order of information elements; and
determining whether the first AP is a malicious AP, based on a result of the comparing.

6. A non-transitory computer-readable recording medium storing a program executable by a processor to perform a method of identifying a malicious AP according to claim 1.

7. A method of identifying a malicious access point (AP) by a terminal apparatus, the method comprising:
predicting pieces of first time information on or after an (n+1)th beacon signal, based on pieces of first time information related to first beacon signals received from a first AP on or before an n-th beacon signal, where n is a natural number greater than 1;
receiving first beacon signals from the first AP on or after the (n+1)th beacon signal;
comparing the predicted pieces of first time information with pieces of first time information of the first beacon signals received on or after the (n+1)th beacon signal; and
determining whether the first AP is a malicious AP, based on a result of the comparing,
wherein the determining of whether the first AP is a malicious AP comprises determining whether the first AP is a malicious AP based on a tendency of difference values between the predicted pieces of first time information and the pieces of first time information of the first beacon signals received on or after the (n+1)th beacon signal according to time.

8. The method of claim 7, wherein the predicting of the pieces of first time information comprises predicting the pieces of first time information on or after the (n+1)th beacon signal through a linear regression analysis.

9. The method of claim 7, wherein the determining of whether the first AP is a malicious AP comprises determining the first AP to be a malicious AP based on the difference values between the predicted pieces of first time information and the pieces of first time information of the first beacon signals received on or after the (n+1)th beacon signal increasing or decreasing according to time.

10. A terminal apparatus comprising:

a memory storing one or more instructions; and a processor configured to execute the one or more instructions stored in the memory, wherein the processor is configured to:

obtain first information of a first access point (AP) based on a first beacon signal received from the first AP;

compare the first information with previously stored second information of a second AP; and determine whether the first AP is a malicious AP, based on a result of the comparing, wherein the first information includes first timestamp information included in the first beacon signal and first receiving time information of the first beacon signal, wherein the second information includes second timestamp information included in a second beacon signal received from the second AP and second receiving time information of the second beacon signal, and wherein the processor is further configured to determine whether the first AP is a malicious AP based on a difference value between the first timestamp information and the second timestamp information being different from a difference value between the first receiving time information and the second receiving time information.

11. The terminal apparatus of claim 10, wherein the processor is configured to:

transmit, to the first AP, a request message including at least one of predetermined identification information and predetermined channel information;

receive a response message from the first AP in response to the request message; and determine the first AP to be a malicious AP, when the response message includes at least one of the predetermined identification information and the predetermined channel information.

12. The terminal apparatus of claim 10, wherein the processor is configured to:

predict pieces of first time information on or after an (n+1)th beacon signal, based on pieces of first time information of first beacon signals received from the first AP on or before an n-th beacon signal, where n is a natural number greater than 1;

receive first beacon signals from the first AP on or after the (n+1)th beacon signal;

compare the predicted pieces of first time information with pieces of first time information of the first beacon signals received on or after the (n+1)th beacon signal; and determine whether the first AP is a malicious AP, based on a result of the comprising, wherein the processor is further configured to determine whether the first AP is a malicious AP based on a tendency of difference values between the predicted pieces of first time information and the pieces of first time information of the first beacon signals received on or after the (n+1)th beacon signal according to time.

13. The terminal apparatus of claim 12, wherein the processor is configured to determine the first AP to be a malicious AP based on the difference values between the predicted pieces of first time information and the pieces of first time information of the first beacon signals received on or after the (n+1)th beacon signal increasing or decreasing according to time.

* * * * *